(12) United States Patent
Hahn et al.

(10) Patent No.: US 12,182,467 B1
(45) Date of Patent: Dec. 31, 2024

(54) SYSTEMS, METHODS, AND DEVICES FOR REAL-TIME TEXTING

(71) Applicant: The Sunnai Marali Company Inc., Manhattan Beach, CA (US)

(72) Inventors: Eric Kyungmo Hahn, Honolulu, HI (US); Geoffrey Sungjun Hahn, Honolulu, HI (US); Arthur Chi-cheng Wang, Manhattan Beach, CA (US)

(73) Assignee: The Sunnai Marali Company Inc., Manhattan Beach, CA (US)

( * ) Notice: Subject to any disclaimer, the term of this patent is extended or adjusted under 35 U.S.C. 154(b) by 0 days.

(21) Appl. No.: 17/942,014

(22) Filed: Sep. 9, 2022

Related U.S. Application Data

(60) Provisional application No. 63/242,682, filed on Sep. 10, 2021.

(51) Int. Cl.
| | |
|---|---|
| *G06F 3/14* | (2006.01) |
| *G06F 3/04845* | (2022.01) |
| *G06F 3/0488* | (2022.01) |
| *H04L 51/04* | (2022.01) |

(52) U.S. Cl.
CPC ........ *G06F 3/1454* (2013.01); *G06F 3/04845* (2013.01); *G06F 3/0488* (2013.01); *H04L 51/04* (2013.01)

(58) Field of Classification Search
CPC ...... G06F 3/1454; G06F 3/14; G06F 3/04845; G06F 3/0484; G06F 3/0488; G06F 3/0487; H04L 51/04; H04L 51/00

USPC ................................................ 715/753, 752
See application file for complete search history.

(56) References Cited

U.S. PATENT DOCUMENTS

| | | | |
|---|---|---|---|
| 2008/0095338 A1* | 4/2008 | Cosky | H04L 9/40 379/88.22 |
| 2009/0103433 A1* | 4/2009 | Katis | H04L 65/4015 370/230 |
| 2009/0104915 A1* | 4/2009 | Katis | H04L 65/4015 455/452.2 |
| 2011/0080427 A1* | 4/2011 | Oda | G06F 3/04883 345/173 |
| 2012/0254773 A1* | 10/2012 | Viswanathan | G06F 3/04883 715/753 |
| 2012/0274662 A1* | 11/2012 | Kim | G11B 27/10 345/650 |
| 2013/0311482 A1* | 11/2013 | Schleier-Smith | G06F 16/2272 707/746 |
| 2014/0059448 A1* | 2/2014 | Lee | H04L 51/00 715/752 |
| 2017/0093769 A1* | 3/2017 | Lind | G06F 3/1454 |
| 2017/0168692 A1* | 6/2017 | Chandra | G06F 3/017 |
| 2019/0095422 A1* | 3/2019 | Chiang | G06F 40/35 |
| 2020/0319754 A1* | 10/2020 | Hwang | G06F 3/0482 |
| 2021/0266273 A1* | 8/2021 | Huang | G06F 3/14 |
| 2022/0150195 A1* | 5/2022 | Chaudhri | G06F 3/04886 |

\* cited by examiner

*Primary Examiner* — Hwei-Min Lu
(74) *Attorney, Agent, or Firm* — Knobbe, Martens, Olson & Bear LLP

(57) ABSTRACT

Disclosed herein are methods relating to embodiments of a real-time texting system which approximates elements of in person conversation. The real-time texting system may include features relating to conveying nuance, visualizing interruptions, and visualizing silences and the passage of time.

12 Claims, 7 Drawing Sheets

SYSTEMS, METHODS, AND DEVICES FOR REAL-TIME TEXTING

CROSS-REFERENCE TO RELATED APPLICATIONS

The present application claims the benefit of U.S. Provisional Application No. 63/242,682, filed Sep. 10, 2021, which is hereby incorporated by reference in its entirety.

BACKGROUND

Field

The present disclosure generally relates to systems, methods, and devices for real-time texting.

SUMMARY

Various embodiments described herein relate to systems, methods, and devices for real-time texting. In some embodiments, the method of real time text includes features designed to approximate natural conversation and enhance ease of use.

The present disclosure generally relates to methods of enhancing interactivity and overall presentation of a "chat" between two or more users, particularly chats which allow for real-time texting. Simple chat messaging applications relay text based messages back and forth, and may allow for some sending of multimedia elements, including video, audio, and pictures. However, presentation of messaging elements is usually based sequentially, on the order of the message after being input into a messaging system. Presented herein are methods and embodiments relating to real time texting, in order to better approximate elements of human conversation, gestures, and other elements that are lost when communicating via text based systems.

In particular, in some embodiments, described herein is a method of computer implemented real-time electronic messaging, the method comprising receiving, by a computer system, from a user device, a first input of a first message for transmitting to a recipient device, wherein the first input is assigned a first time index, wherein the first input is received character-by-character; causing, by the computer system, generation of a first display on the user device and a second display on the recipient device, wherein the first input appears character-by-character on both the first display and the second display in substantially real-time, wherein a position of the first input on the first display and the second display is determined by the first time index, wherein the position of the first input on the first display and the second display changes based on a passage of a unit of time; receiving, by the computer system, from the recipient device, a second input of a second message for transmitting to the user device, wherein the second input is assigned a second time index, wherein the second input is received character-by-character, wherein the second input is received at a time later than the first input but before the first input is complete; causing, by the computer system, an update of the first display and the second display, wherein the second input appears character-by-character on the first display and the second display, wherein a position of the second input on the first display and the second display is determined by the second time index, wherein the position of the second input on the first display and the second display changes based on the passage of the unit of time, wherein the position of the second input on the first display and the second display overlaps with the position of the first input on the first display and the second display when the first and second time indexes are within a predetermined range threshold; and wherein the computer system comprises a computer processor and an electronic storage medium. In some embodiments, the method further includes having the recipient device and the user device both be configured to provide haptic feedback to users that text at the same time or interrupt another participant. In some embodiments, the method further includes altering the appearance of the first input and the second input when users text at the same time or interrupt another participant.

In some embodiments of the method described herein, the first input is removed from the first display and the second display based on the passage of a unit of time. In some embodiments, the first input on the first display and the second display may change positions in the X or Y direction, or a combination of X and/or Y directions, based on the passage of a unit of time. In some embodiments, the first input on the first display and the second display may roll off the first display and the second display based on the passage of a unit of time. In some embodiments, the second input is removed from the first display and the second display based on the passage of a unit of time. In some embodiments, the second input on the first display and the second display may change positions in the X or Y direction, or a combination of X and/or Y directions, based on the passage of a unit of time. In some embodiments, the second input on the first display and the second display may roll off the first display and the second display based on the passage of a unit of time. In some embodiments, both the first and the second input may move in identical directions. In some embodiments, the first display and the second display are updated to change the position of all or a portion of the first or second input based on the passage of a unit of time.

In some embodiments of the method described herein, the first input is removed from the first display and the second display based on a user input. In some embodiments, the first input on the first display and the second display may change positions in the X or Y direction, or a combination of X and/or Y directions, based on a user input. In some embodiments, the first input on the first display and the second display may roll off the first display and the second display based on a user input. In some embodiments, the second input is removed from the first display and the second display based on a user input. In some embodiments, the second input on the first display and the second display may change positions in the X or Y direction, or a combination of X and/or Y directions, based on a user input. In some embodiments, the second input on the first display and the second display may roll off the first display and the second display based on a user input. In some embodiments, both the first and the second input may move in identical directions.

In some embodiments, the method described herein further includes receiving, by the computer system from the user device transmitting to the recipient device, a touch input, wherein the first display and the second display is updated to change the position of all or a portion of the first or second input in response to the touch input. In some embodiments, the change of position of the first or second input includes a change in orientation of all or a portion of the first or second input. In some embodiments, the touch input includes directionality and pressure information. In some embodiments, the change of position of all or a portion of the first or second input is calculated based on the directionality and pressure information of the touch input. In some embodiments, the touch input comprises a user performing a hold and drag maneuver on the user device. In some embodiments, the hold and drag maneuver on the user device is performed on the last letter of a word. In some embodiments, the touch input adds a punctuation mark to the first or second input. In some embodiments, the touch input is further customizable by a user.

In some embodiments, the method described herein further includes wherein the first input is assigned a first identifying color, and the second input is assigned a second identifying color; wherein the display on the user device and the display on the recipient device renders the first input in the first identifying color and the second input in the second identifying color, wherein the first and the second identifying color are not identical. In some embodiments, the method described herein further includes where the first input is assigned a first unique identifier, and the second input is assigned a second unique identifier, wherein the display on the user device and the display on the recipient device renders the first input in the first unique identifier and the second input in the second unique identifier, wherein the first and the second unique identifiers are not identical. In some embodiments, the first and second unique identifier may be a set of specific fonts, colors, or other stylizations. In some embodiments, each participant in a chat room is identified by color only and not by name. In some embodiments, each participant in a chat room is identified by unique identifier only and not by name.

In some embodiments, the method described herein further includes the first display possessing a window. In some embodiments, the window is positioned at the same coordinates on the second display as in the first display. In some embodiments, the window is shared among all participants of a chat room. In some embodiments, one or more users can pull down their display to reveal the window. In some embodiments, the window can be clear to view a shared display or whiteboard. In some embodiments, the window can be used to video chat. In some embodiments, the window can be frosted, or otherwise translucent. In some embodiments, a user can alter transparency of the window. In some embodiments, a user can alter the translucency of the window. In some embodiments, users may be required to make identical inputs to alter transparency or translucency of the window. In some embodiments, users may manipulate the size, position, or shape of the window.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
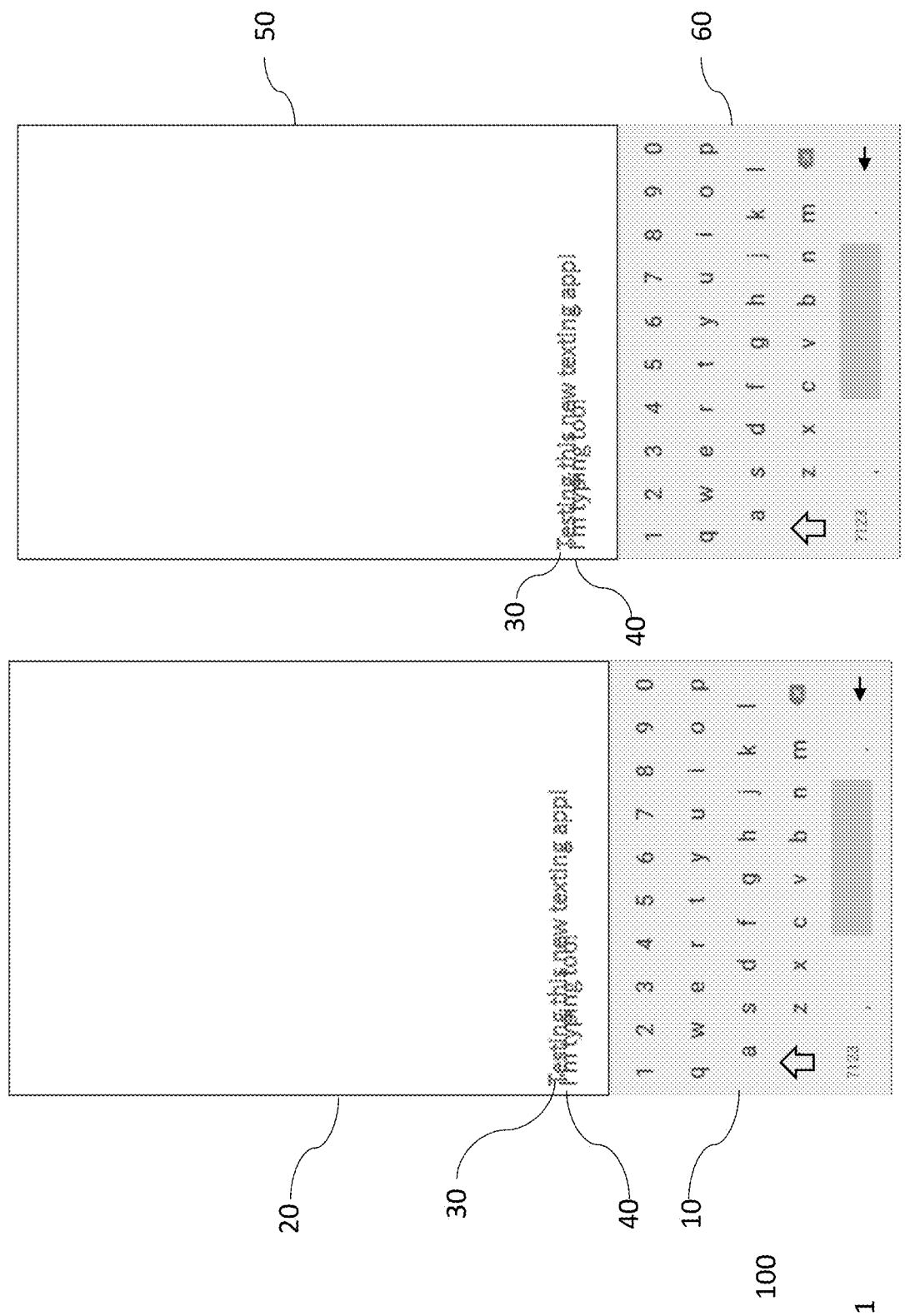
FIG. 1 illustrates a set of inputs according to an embodiment(s) of the RTT system of the present disclosure.

The detailed description set forth below in connection with the drawings is intended as a description of various configurations and is not intended to represent the only configurations in which the concepts described herein may be practiced. The detailed description include specific details for the purpose of providing a thorough understanding of various concepts. However, it will be apparent to those skilled in the art that these concepts may be practiced without these specific details.

All patents, applications, published applications and other publications referred to herein are incorporated herein by reference to the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

Definitions

All technical and scientific terms used herein have the same meaning as commonly understood to one of ordinary skill in the art to which this disclosure belongs unless clearly indicated otherwise.

As used herein, the singular forms "a", "and", and "the" include plural referents unless the context clearly dictates otherwise. Thus, for example, reference to "a sequence" may include a plurality of such sequences, and so forth.

The terms comprising, including, containing and various forms of these terms are synonymous with each other and are meant to be equally broad. Moreover, unless explicitly stated to the contrary, examples comprising, including, or having an element or a plurality of elements having a particular property may include additional elements, whether or not the additional elements have that property.

As used herein, the term "electronic messaging" refers to a technology which allows for the transmission of electronic signals from an originator device to a recipient device. In general, the transmission of electronic signals may be interpreted by either the originator device or the recipient device, or any device which relays the electronic signal in between the originator or the recipient device. In particular, in some embodiments, "real-time electronic messaging", otherwise known as Real-Time Texting (RTT), may refer to a technology which transmits electronic signals contemporaneously without the need for a separate input from a user to indicate a message is ready to send. Using a RTT system, in some embodiments, multiple users can send and receive messages on multiple electronic devices, with each user being able to see the contemporaneous input from other users.

INTRODUCTION

Aspects of the present disclosure relate generally to communication systems, devices, and methods. In particular, in some embodiments, the present disclosure relates to communication systems, devices, and methods in which messages are exchanged between multiple devices in real-time.

Generally speaking, in computer-computer, mobile-mobile, and computer-mobile communication programs, real time text (RTT) can allow for near instantaneous transmission of text content between multiple devices. For example, in a conversation between two users, a user of a source device and a user of a receiver device may readily see the text content of a RTT message without having to "send" completed messages. In some embodiments, the transmission of text may appear character-by-character, word-by-word, or some characters can be transmitted based on some other pre-set criteria. RTT messages may more closely resemble elements of natural conversation compared to other text messaging systems, allowing for "interruptions" and opportunities to reconsider or revise a message based on the immediate feedback an RTT system provides to users.

In some systems, RTT systems may further integrate additional features to better approximate a natural conversation. For instance, the position of messages may expire and disappear from a screen after a period of time, to visually indicate the progression of time, or even a "pause" in a conversation. In some embodiments, RTT systems may further include color coded or other user identifier information, to allow for the efficient display of text communication in a user-friendly and convenient format.

Additionally, text communication systems can have integrated emotive features beyond normal text punctuation. For example, some users may attempt to send creative combinations of text and punctuation to convey emotion, while some communication programs integrate "emoji" symbol support to allow for the transmission of simple pictograms and symbols that convey emotion and context to other users.

However, because of certain limitations inherent in previous text based communication systems, and RTT systems in general, it may be desirable to develop improved methods, systems, and devices of messaging, for example such as certain embodiments described herein.

SUMMARY

Various embodiments described herein relate to systems, methods, and devices for real-time texting. In some embodiments, the method of real time text includes features designed to approximate natural conversation and enhance ease of use.

In particular, in some embodiments, described herein is a method of computer implemented real-time electronic messaging, the method comprising receiving, by a computer system, from a user device, a first input of a first message for transmitting to a recipient device, wherein the first input is assigned a first time index, wherein the first input is received character-by-character; causing, by the computer system, generation of a first display on the user device and a second display on the recipient device, wherein the first input appears character-by-character on both the first display and the second display in substantially real-time, wherein a position of the first input on the first display and the second display is determined by the first time index, wherein the position of the first input on the first display and the second display changes based on a passage of a unit of time; receiving, by the computer system, from the recipient device, a second input of a second message for transmitting to the user device, wherein the second input is assigned a second time index, wherein the second input is received character-by-character, wherein the second input is received at a time later than the first input but before the first input is complete; causing, by the computer system, an update of the first display and the second display, wherein the second input appears character-by-character on the first display and the second display, wherein a position of the second input on the first display and the second display is determined by the second time index, wherein the position of the second input on the first display and the second display changes based on the passage of the unit of time, wherein the position of the second input on the first display and the second display overlaps with the position of the first input on the first display and the second display when the first and second time indexes are within a predetermined range threshold; and wherein the computer system comprises a computer processor and an electronic storage medium. In some embodiments, the method further includes having the recipient device and the user device both be configured to provide haptic feedback to users that text at the same time or interrupt another participant.

In some embodiments of the method described herein, the first input is removed from the first display and the second display based on the passage of a unit of time. In some embodiments, the first input on the first display and the second display may change positions in the X or Y direction, or a combination of X and/or Y directions, based on the passage of a unit of time. In some embodiments, the first input on the first display and the second display may roll off the first display and the second display based on the passage of a unit of time. In some embodiments, the second input is removed from the first display and the second display based on the passage of a unit of time. In some embodiments, the second input on the first display and the second display may change positions in the X or Y direction, or a combination of X and/or Y directions, based on the passage of a unit of time. In some embodiments, the second input on the first display and the second display may roll off the first display and the second display based on the passage of a unit of time. In some embodiments, both the first and the second input may move in identical directions. In some embodiments, a system configured to process the methods herein are described.

In some embodiments of the method described herein, the first input is removed from the first display and the second display based on a user input. In some embodiments, the first input on the first display and the second display may change positions in the X or Y direction, or a combination of X and/or Y directions, based on a user input. In some embodiments, the first input on the first display and the second display may roll off the first display and the second display based on a user input. In some embodiments, the second input is removed from the first display and the second display based on a user input. In some embodiments, the second input on the first display and the second display may change positions in the X or Y direction, or a combination of X and/or Y directions, based on a user input. In some embodiments, the second input on the first display and the second display may roll off the first display and the second display based on a user input. In some embodiments, both the first and the second input may move in identical directions.

In some embodiments, the method described herein further includes receiving, by the computer system from the user device transmitting to the recipient device, a touch input, wherein the first display and the second display is updated to change the position of all or a portion of the first or second input in response to the touch input. In some embodiments, the change of position of the first or second input includes a change in orientation of all or a portion of the first or second input. In some embodiments, the touch input includes directionality and pressure information. In some embodiments, the change of position of all or a portion of the first or second input is calculated based on the directionality and pressure information of the touch input. In some embodiments, the touch input comprises a user performing a hold and drag maneuver on the user device. In some embodiments, the hold and drag maneuver on the user device is performed on the last letter of a word. In some embodiments, the touch input adds a punctuation mark to the first or second input. In some embodiments, the touch input is further customizable by a user.

In some embodiments, the method described herein further includes wherein the first input is assigned a first identifying color, and the second input is assigned a second identifying color; wherein the display on the user device and the display on the recipient device renders the first input in the first identifying color and the second input in the second identifying color, wherein the first and the second identifying color are not identical. In some embodiments, the method described herein further includes where the first input is assigned a first unique identifier, and the second input is assigned a second unique identifier, wherein the display on the user device and the display on the recipient device renders the first input in the first unique identifier and the second input in the second unique identifier, wherein the first and the second unique identifiers are not identical. In some embodiments, the first and second unique identifier may be a set of specific fonts, colors, or other stylizations. In some embodiments, each participant in a chat room is identified by color only and not by name. In some embodiments, each participant in a chat room is identified by unique identifier only and not by name.

In some embodiments, the method described herein further includes the first display possessing a window. In some embodiments, the window is positioned at the same coordinates on the second display as in the first display. In some embodiments, the window is shared among all participants of a chat room. In some embodiments, one or more users can pull down their display to reveal the window. In some embodiments, the window can be clear to view a shared display or whiteboard. In some embodiments, the window can be used to video chat. In some embodiments, the window can be frosted, or otherwise translucent. In some embodiments, a user can alter transparency of the window. In some embodiments, a user can alter the translucency of the window. In some embodiments, users may be required to make identical inputs to alter transparency or translucency of the window. In some embodiments, users may manipulate the size, position, or shape of the window.

Real Time Texting

Some embodiments provided herein relate to systems, methods, and devices of realtime texting (RTT). Such systems, devices, and methods may include additional features and functionality to facilitate ease of use or to better approximate elements of spoken conversation. While certain RTT systems, devices, and methods described herein may be in reference to text communications between multiple computing devices, embodiments described herein may also be applied to any situation wherein at least two instances of a computer program or application are instantiated to allow for communication between at least two computing devices, including between two mobile phone platforms. Accordingly, embodiments of the systems, methods, and devices provided herein may not be limited to between two computers, or between two mobile phone platforms, or between a computer and a mobile phone platform. In some embodiments, the RTT system, method, and/or device allows all recipients to view in real-time, letter-by-letter or word-by-word inputs, without a user having to press send or some other input to deliver their message.

Advantageously, some embodiments of the systems, methods, and devices disclosed herein allow for a text conversation between at least two users to approximate features inherent in verbal conversations, including interruption and mimicking the passage of time. For example, in some embodiments, the real-time electronic messaging allows for interruptions in the form of text from multiple users being overlaid when messages from multiple users are sent contemporaneously in time. In some embodiments, transmitting text in a manner which allows for interruption can be particularly advantageous for users wishing to change the content of their message based on the response of other users. In some embodiments, messages appearing on user screens can "scroll" up as time progresses, thereby indicating the passage of any arbitrary unit of time, or other input from a user.

With reference to FIG. 1, an embodiment of the present RTT system is disclosed herein. FIG. 1 depicts two screens. First screen 20 on a user device, and the second screen 50 on the recipient device. As a user enters text by interacting with user device keyboard 10, or recipient device keyboard 60, an input or inputs will appear on both screen 20 and screen 50. For text entered using user device keyboard 10, inputs 30 will appear on both screen 20 and screen 50. Similarly, for text entered using user device keyboard 60, inputs 40 will appear on both screen 20 and screen 50. In some embodiments, multiple devices allow for a plurality of users to utilize the RTT system. In some embodiments, inputs 30 or inputs 40 are differentiated based on color. In some embodiments, inputs 30 or inputs 40 are differentiated based on a unique graphic, font, or other identifying feature. In some embodiments, inputs 30 and inputs 40 may overlap as a function of time. In some embodiments, when inputs 30 and inputs 40 overlap, the RTT system can provide haptic feedback to users.

By way of illustration, FIG. 1 depicts two screens in communication with each other. However, multiple users and therefore multiple screens can be integrated into the RTT system described herein.

Figure 2:
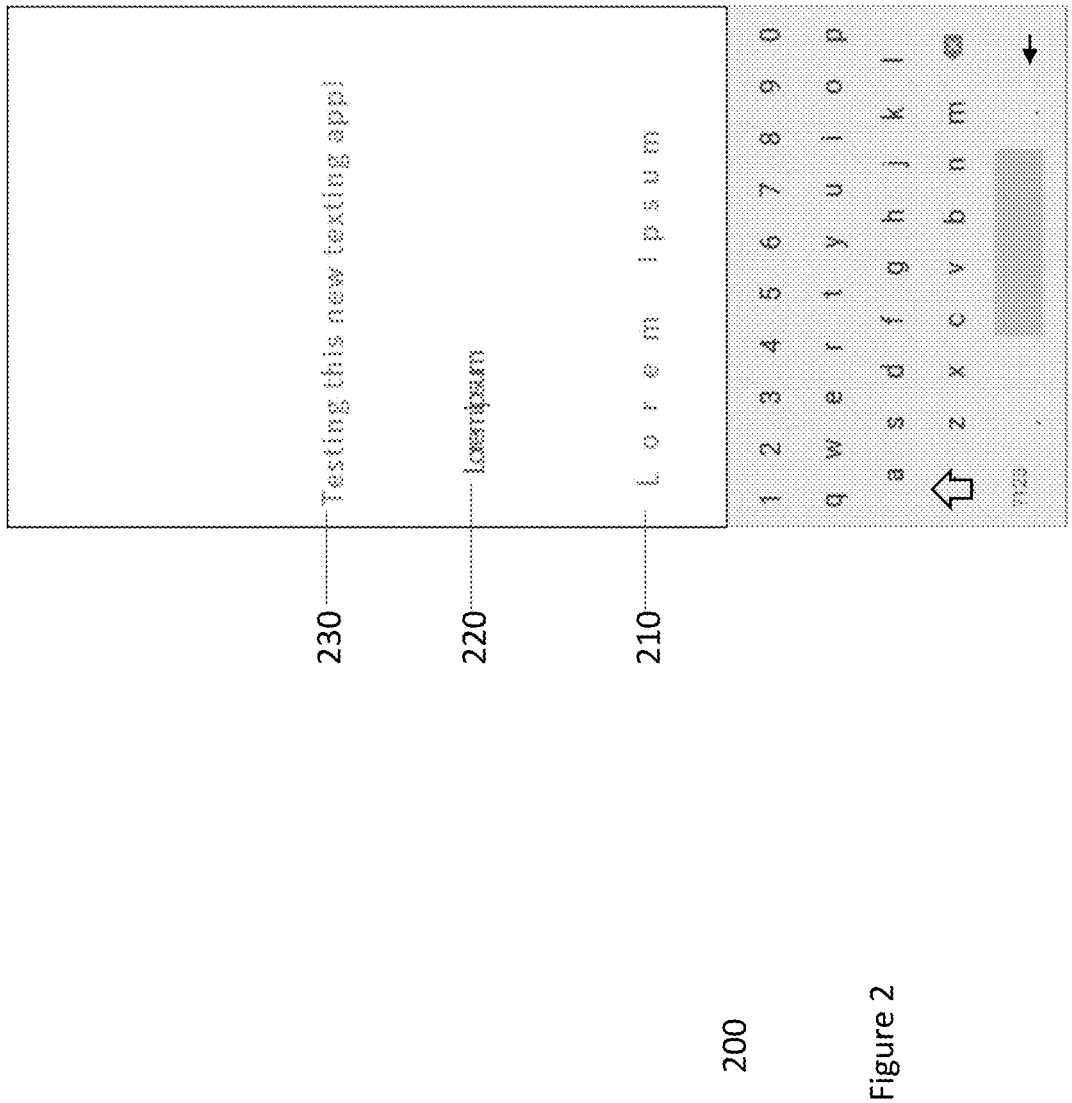
FIG. 2 illustrates a set of inputs typed at varying speeds and at different times according to an embodiment(s) of the RTT system of the present disclosure.

FIG. 2 illustrates an embodiment of the present RTT system 200 wherein text on a screen dynamically changes position based on a time index. Each time a user enters an individual character, said input or character is assigned a time element. A user device or recipient device, when displaying an input, will use the corresponding time element to assign each character or input a position. When typing in a quick manner, the position of each individual element or character may overlap like in inputs 220. Conversely, when typing in a languorous manner, the position of each individual element or character may be spread further from each other like in inputs 210. Additionally, character or input positions may update in real time, so that the message appears to be moving relative to the screen, like inputs 230. In some embodiments, the inputs may roll off the screen.

Figure 3:
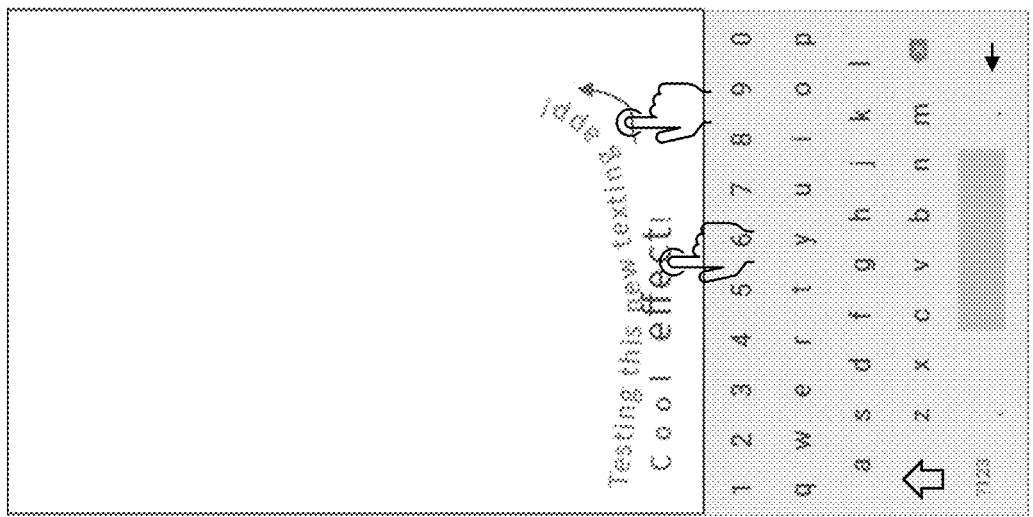
FIG. 3 illustrates a set of inputs to convey nuance and emphasis according to an embodiment(s) of the RTT system of the present disclosure.

FIG. 3 illustrates an embodiment of the present RTT system wherein users convey nuance or context. In particular, the RTT system may be configured to allow a user to hold and drag the last letter of a word in one of a plurality of directions to convey nuance. For example, in some embodiments, a user may perform a hold and drag action on the last letter of a word upwards to convey enthusiasm. In some embodiments, enthusiasm is represented by all or part of an input moving along the direction of the hold and drag action. In some embodiments, the hold and drag action includes pressure and directionality information. In some embodiments, the RTT system is configured to allow a user to hold and drag the last letter of a word in a particular fashion and/or direction to easily add punctuation, such as a period, exclamation mark, and/or the like. In some embodiments, the nuance conveyed by different hold and drag actions can be customizable by the user. In some embodiments, the hold and drag action can alter the size of all or part of an input.

Figure 5:
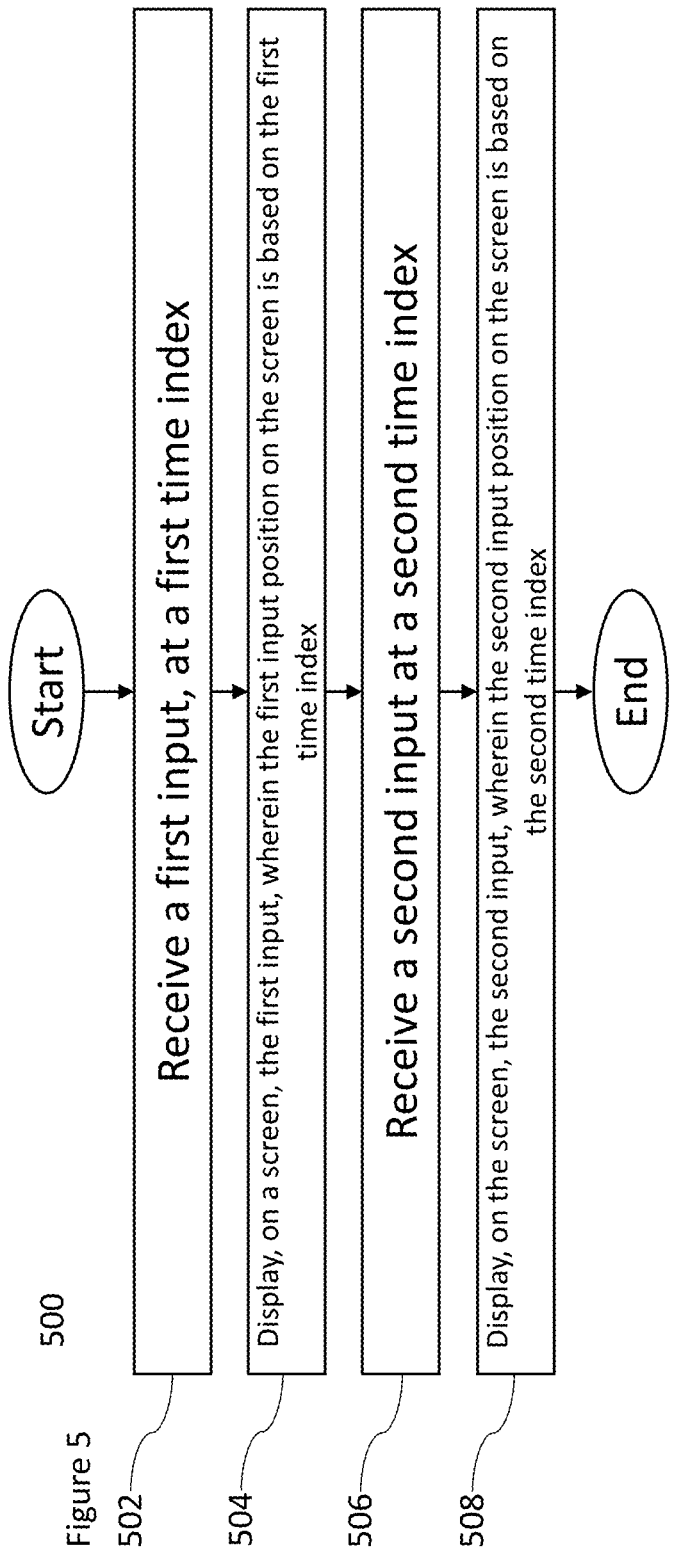
FIG. 5-7 are a series of flow-diagrams depicting embodiment(s) of the system described herein.

FIG. 5 illustrates an embodiment of the present RTT system 500, wherein a computer system receives a series of inputs. Starting at 502, the computer system receives a first input, which is logged at a first time index. In some embodiments, the input may be word-by-word, character-by-character, or some combination requiring users to further input a transmission trigger. At 504, the system displays on a screen the first input, positioning the first input on the screen based on the first time index. At 506, the computer system receives a second input, which is logged at a second time index. In some embodiments, the input may be word-by-word, character-by-character, or some combination requiring users to further input a transmission trigger. At 508, the system displays on a screen the second input, positioning the second input on the screen based on the first time index. As described herein, elements of the steps described in 500 may correspond to FIG. 1.

Figure 6:
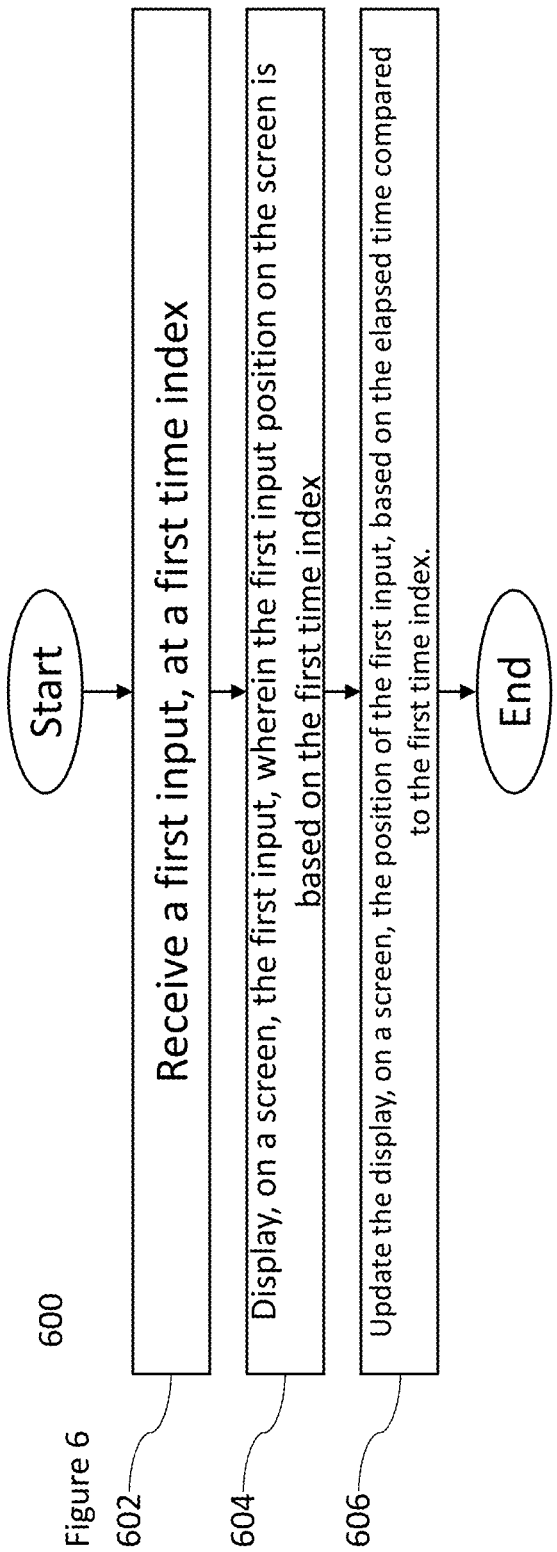

FIG. 6 illustrates an embodiment of the present RTT system 600, wherein a computer system receives a series of inputs. Starting at 602, the computer system receives a first input, which is logged at a first time index. In some embodiments, the input may be word-by-word, character-by-character, or some combination requiring users to further input a transmission trigger. At 604, the system displays on a screen the first input, positioning the first input on the screen based on the first time index. At 606, the computer system updates the display and the first input position on the screen, based on the elapsed time compared to the first time index. In some embodiments, the step 606 may be repeated until some arbitrary elapsed time. In some embodiments, the arbitrary elapsed time corresponds to when the position of the first input is near or at the margins of the display. As described herein, elements of the steps described in 600 may correspond to FIG. 1.

Figure 7:
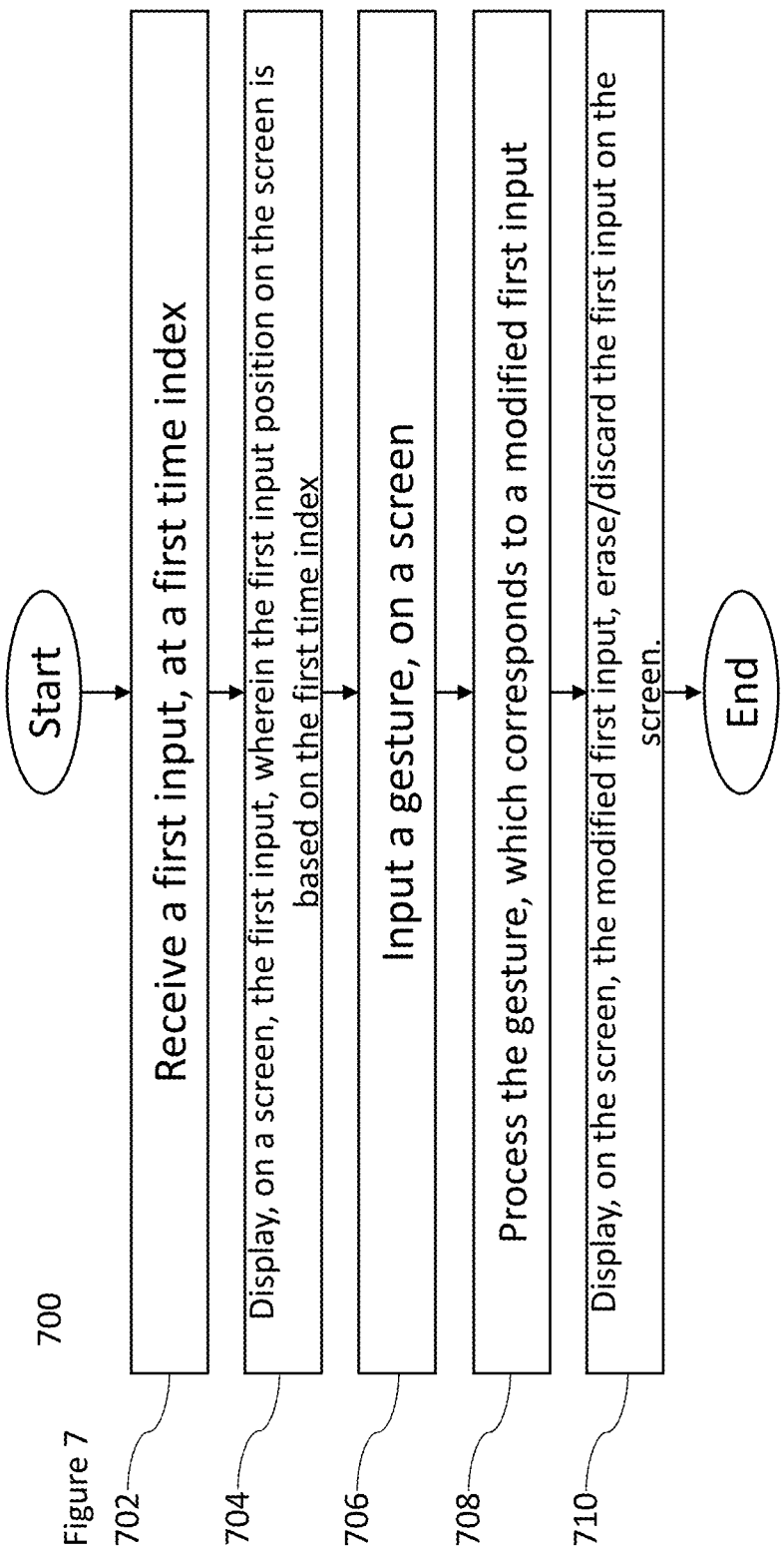

FIG. 7 illustrates an embodiment of the present RTT system 700, wherein a computer system receives a series of inputs. Starting at 702, the computer system receives a first input, which is logged at a first time index. In some embodiments, the input may be word-by-word, character-by-character, or some combination requiring users to further input a transmission trigger. At 704, the system displays on a screen the first input, positioning the first input on the screen based on the first time index. At 706, the computer system receives a gesture, or gesture input. In some embodiments, the gesture input can be any one or more of the following: touch, tap, hold, press, tap, pinch, swipe, or movement, including shaking, dropping, throwing, or otherwise physically manipulating the computer system. At 708, the computer system processes the gesture, and generates a corresponding modified first input. At 710, the computer system then displays, on the screen, the modified first input, and erases or discards the first input. As described herein, elements of the steps described in 700 may correspond to FIG. 3.

Computer System

Figure 4:
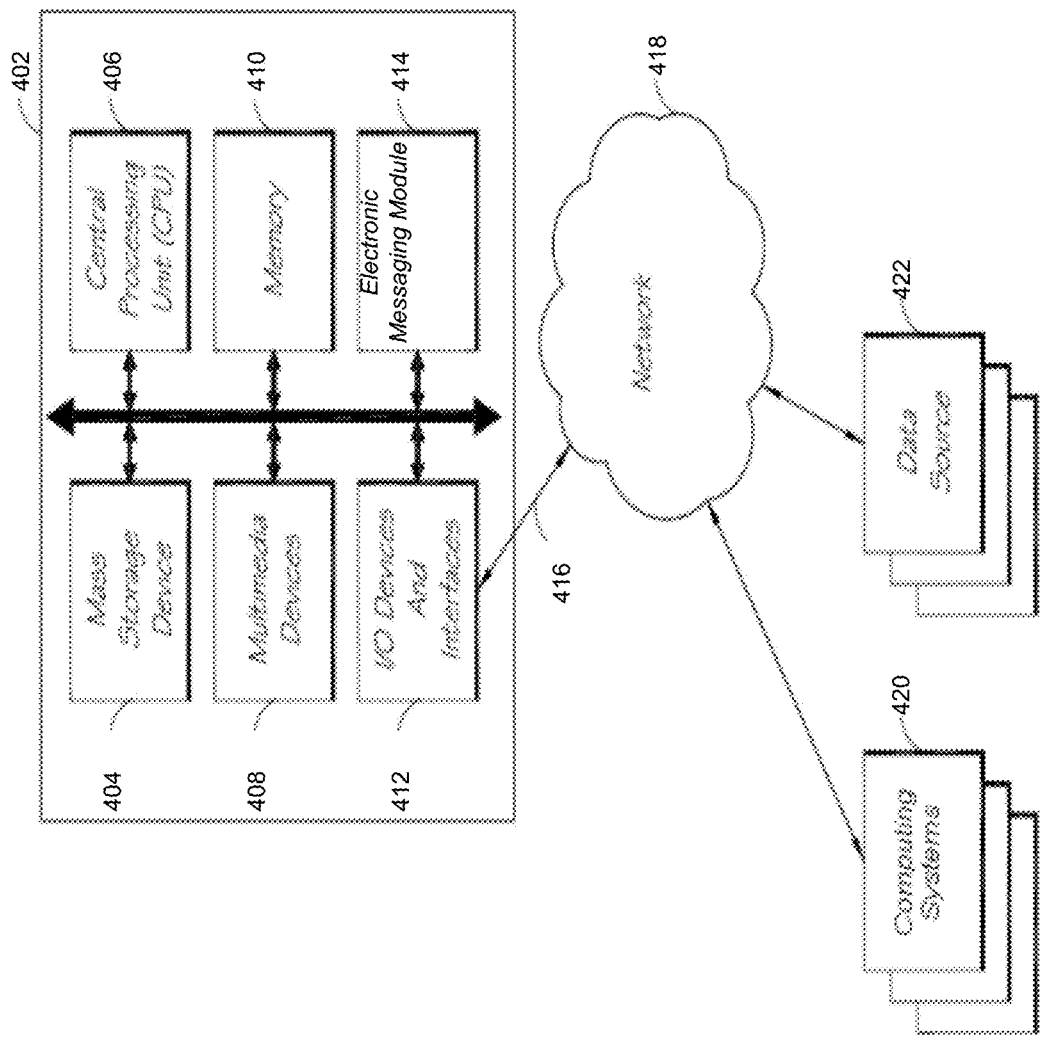
FIG. 4 is a block diagram depicting an embodiment(s) of a computer hardware system configured to run software for implementing one or more embodiments of systems, devices, and methods for real-time texting.

In some embodiments, the systems, processes, and methods described herein are implemented using a computing system, such as the one illustrated in FIG. 4. The example computer system 402 is in communication with one or more computing systems 420 and/or one or more data sources 422 via one or more networks 418. The computer system 402 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like. Additionally, the one or more networks 418 may be any wired network, wireless network, or combination thereof. In addition, the one or more networks 418 may be a personal area network, local area network, wide area network, over-the-air broadcast network, cable network, satellite network, cellular telephone network, or combinations thereof. In some embodiments, the one or more networks 418 may be a private or semi-private network, and may include one or more wireless networks, such as a Global System for Mobile Communications (GSM) network, a Code Division Multiple Access (CDMA) network, a Long Term Evolution (LTE) network, or any other type of wireless network. The one or more networks 418 can use protocols and components for communicating via the Internet or any of the other aforementioned types of networks.

While FIG. 4 illustrates an embodiment of a computing system 402, it is recognized that the functionality provided for in the components and modules of computer system 402 can be combined into fewer components and modules, or further separated into additional components and modules.

The computer system 402 can comprise an electronic messaging module 414 that carries out the functions, methods, acts, and/or processes described herein. The electronic messaging module 414 is executed on the computer system 402 by a central processing unit 406 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware include connected logic units such as gates and flip-flops, and/or can include programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

Computing System Components

The computer system 402 includes one or more processing units (CPU) 406, which can comprise a microprocessor. The computer system 402 further includes a physical memory 410, such as random access memory (RAM) for temporary storage of information, a read only memory (ROM) for permanent storage of information, and a mass storage device 404, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 402 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA)architectures.

The computer system 402 includes one or more input/output (I/O) devices and interfaces 412, such as a keyboard, mouse, touch pad, and printer. The I/O devices and interfaces 412 can include one or more display devices, such as a monitor, that allows the visual presentation of data to a user. More particularly, a display device provides for the presentation of GUIs as application software data, and multi-media presentations, for example. The I/O devices and interfaces 412 can also provide a communications interface to various external devices. The computer system 402 can comprise one or more multi-media devices 408, such as speakers, video cards, graphics accelerators, and microphones, for example.

Computing System Device/Operating System

The computer system 402 can run on a variety of computing devices, such as a server, a Windows server, a Structure Query Language server, a Unix Server, a personal computer, a laptop computer, and so forth. In other embodiments, the computer system 402 can run on a cluster computer system, a mainframe computer system and/or other computing system suitable for controlling and/or communicating with large databases, performing high volume transaction processing, and generating reports from large databases. The computing system 402 is generally controlled and coordinated by an operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 402 illustrated in FIG. 4 is coupled to a network 418, such as a LAN, WAN, or the Internet via a communication link 416 (wired, wireless, or a combination thereof). Network 418 communicates with various computing devices and/or other electronic devices. Network 418 is communicating with one or more computing systems 420 and one or more data sources 422. The electronic messaging module 414 can access or can be accessed by computing systems 420 and/or data sources 422 through a web-enabled user access point. Connections can be a direct physical connection, a virtual connection, and other connection type. The web-enabled user access point can comprise a browser module that uses text, graphics, audio, video, and other media to present data and to allow interaction with data via the network 418.

The output module can be implemented as a combination of an all-points addressable display such as a cathode ray tube (CRT), a liquid crystal display (LCD), a plasma display, or other types and/or combinations of displays. The output module can be implemented to communicate with input devices 412 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 402 can include one or more internal and/or external data sources (for example, data sources 422). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 402 can also access one or more data sources 422. The data sources 422 can be stored in a database or data repository. The computer system 402 can access the one or more data sources 422 through a network 418 or can directly access the database or data repository through I/O devices and interfaces 412. The data repository storing the one or more data sources 422 can reside within the computer system 402.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer.

Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Embodiments

While operations may be depicted in the drawings or described in the specification in a particular order, such operations need not be performed in the particular order shown or in sequential order, or that all operations be performed, to achieve desirable results. In particular, elements presented relating to GUI elements or displays to a user may be presented in any particular order to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed or others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the features described herein can be provided separately, or integrated together (e.g., packaged together, or attached together).

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Although the foregoing invention has been described in terms of certain preferred embodiments, other embodiments will be apparent to those of ordinary skill in the art. Additionally, other combinations, omissions, substitutions and modification will be apparent to the skilled artisan, in view of the disclosure herein. Accordingly, the present invention is not intended to be limited by the recitation of the preferred embodiments, but is instead to be defined by reference to the appended claims. All references cited herein are incorporated by reference in their entirety.

The terminology used in the description presented herein is not intended to be interpreted in any limited or restrictive manner and unless otherwise indicated refers to the ordinary meaning as would be understood by one of ordinary skill in the art in view of the specification. Furthermore, embodiments may comprise, consist of, consist essentially of, several novel features, no single one of which is solely responsible for its desirable attributes or is believed to be essential to practicing the embodiments herein described. As used herein, the section headings are for organizational purposes only and are not to be construed as limiting the described subject matter in any way. All literature and similar materials cited in this application, including but not limited to, patents, patent applications, articles, books, treatises, and internet web pages are expressly incorporated by reference in their entirety for any purpose. When definitions of terms in incorporated references appear to differ from the definitions provided in the present teachings, the definition provided in the present teachings shall control. It will be appreciated that there is an implied "about" prior to the temperatures, concentrations, times, etc. discussed in the present teachings, such that slight and insubstantial deviations are within the scope of the present teachings herein.

Although this disclosure is in the context of certain embodiments and examples, those of ordinary skill in the art will understand that the present disclosure extends beyond the specifically disclosed embodiments to other alternative embodiments and/or uses of the embodiments and obvious modifications and equivalents thereof. In addition, while several variations of the embodiments have been shown and described in detail, other modifications, which are within the scope of this disclosure, will be readily apparent to those of ordinary skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes or embodiments of the disclosure. Thus, it is intended that the scope of the present disclosure herein disclosed should not be limited by the particular disclosed embodiments described above.

The invention claimed is:

1. A computer-implemented method of real-time electronic messaging, the method comprising:
   receiving, by a computer system, from a user device, a first input of a first message for transmitting to a recipient device, wherein the first input is assigned a first time index, wherein the first input is received character-by-character;
   causing, by the computer system, generation of a first display on the user device and a second display on the recipient device, wherein the first input appears character-by-character on both the first display and the second display in real-time, wherein a position of the first input on the first display and the second display is determined by the first time index, wherein the position of the first input on the first display and the second display changes based on a passage of a unit of time;
   receiving, by the computer system, from the recipient device, a second input of a second message for transmitting to the user device, wherein the second input is assigned a second time index, wherein the second input is received character-by-character, wherein the second input is received at a time later than the first input but before the first input is complete;
   causing, by the computer system, an update of the first display and the second display,
   wherein the second input appears character-by-character on the first display and the second display, wherein a position of the second input on the first display and the second display is determined by the second time index,
   wherein the position of the second input on the first display and the second display changes based on the passage of the unit of time,
   wherein (i) the position of the second input on the first display overlaps with the position of the first input on the first display and (ii) the position of the second input on the second display overlaps with the position of the first input on the second display such that the amount of overlap between the position of the second input and the position of the first input is proportional to a temporal gap between the first time index and the second time index; and
   wherein the computer system comprises a computer processor and a non-transitory electronic storage medium.

2. The method of claim 1, wherein the first input is removed from the first display and the second display based on a passage of additional units of time.

3. The method of claim 1, wherein the second input is removed from the first display and the second display based on a passage of additional units of time.

4. The method of claim 1, further comprising receiving, by the computer system, from the user device transmitting to the recipient device, a touch input, wherein the first display and the second display are updated to change the position of all or a portion of the first or second input in response to the touch input.

5. The method of claim 4, wherein the change of the position of all or the portion of the first or second input includes a change in orientation of all or the portion of the first or second input.

6. The method of claim 4, wherein the touch input includes directionality and pressure information.

7. The method of claim 6, wherein the change of the position of all or the portion of the first or second input is calculated based on the directionality and pressure information of the touch input.

8. The method of claim 1, wherein the first input is assigned a first identifying color, and the second input is assigned a second identifying color; wherein the display on the user device and the display on the recipient device renders the first input in the first identifying color and the second input in the second identifying color, wherein the first and the second identifying color are not identical.

9. The method of claim 1, wherein the first display and the second display are updated to change the position of all or a portion of the first or second input based on the passage of the unit of time.

10. The method of claim 9, wherein the first input is removed from the first display and the second display based on an input or a passage of additional units of time.

11. The method of claim 9, wherein the second input is removed from the first display and the second display based on an input or a passage of additional units of time.

12. A system for implementing real-time electronic messaging, the system comprising:
    a computer system comprising a computer processor and a non-transitory electronic storage medium; and
    a RTT service comprising computer hardware, wherein the RTT service is configured to at least:
    receive, by the computer system, from a user device, a first input of a first message for transmitting to a recipient device, wherein the first input is assigned a first time index, wherein the first input is received character-by-character;
    cause, by the computer system, generation of a first display on the user device and a second display on the recipient device, wherein the first input appears character-by-character on both the first display and the second display in real-time, wherein a position of the first input on the first display and the second display is determined by the first time index, wherein the position of the first input on the first display and the second display changes based on a passage of a unit of time;
    receive, by the computer system, from the recipient device, a second input of a second message for transmitting to the user device, wherein the second input is assigned a second time index, wherein the second input is received character-by-character, wherein the second input is received at a time later than the first input but before the first input is complete; and
    cause, by the computer system, an update of the first display and the second display, wherein the second input appears character-by-character on the first display and the second display,
    wherein a position of the second input on the first display and the second display is determined by the second time index,
    wherein the position of the second input on the first display and the second display changes based on the passage of the unit of time, and wherein (i) the position of the second input on the first display overlaps with the position of the first input on the first display and (ii) the position of the second input on the second display overlaps with the position of the first input on the second display-such that the amount of overlap between the position of the second input and the position of the first input is proportional to a temporal gap between the first time index and the second time index.

\* \* \* \* \*